(12) United States Patent  
Harbin

(10) Patent No.: US 6,286,794 B1
(45) Date of Patent: Sep. 11, 2001

(54) ERGONOMIC COMPUTER MOUNTING DEVICE PERMITTING EXTENSIVE VERTICAL, HORIZONTAL AND ANGULAR RANGES OF MOTION

(76) Inventor: Bradley Harbin, P.O. Box 667 110 W. 8th St., Lewisville, AR (US) 71845-0667

( * ) Notice: Subject to any disclaimer, the term of this patent is extended or adjusted under 35 U.S.C. 154(b) by 0 days.

(21) Appl. No.: 09/592,022

(22) Filed: Jun. 12, 2000

Related U.S. Application Data

(60) Provisional application No. 60/139,428, filed on Jun. 14, 1999.

(51) Int. Cl.[7] .................................................. F16M 11/00
(52) U.S. Cl. ................................... 248/123.2; 248/125.2; 248/280.11; 248/281.11; 248/918
(58) Field of Search .......................... 248/121, 122.1, 248/123.11, 123.2, 124.1, 125.1, 125.2, 280.11, 281.11, 917, 918, 919

(56) References Cited

U.S. PATENT DOCUMENTS

| | | | | |
|---|---|---|---|---|
| 1,070,524 | * | 8/1913 | Pieper | 248/281.11 |
| 1,977,970 | * | 10/1934 | Parks | 248/123.2 |
| 2,041,242 | * | 5/1936 | Goldfield | 248/123.2 |
| 2,051,508 | * | 8/1936 | Wildeboer | 248/123.2 |
| 5,738,316 | * | 4/1998 | Sweere | 248/123.11 |
| 5,820,086 | * | 10/1998 | Hoffman | 248/125.2 |
| 5,918,841 | * | 7/1999 | Sweere | 248/281.11 |
| 6,076,785 | * | 6/2000 | Oddsen | 248/281.11 |

* cited by examiner

Primary Examiner—Alvin Chin-Shue

(57) ABSTRACT

A computer workstation mounting device is provided which permits devices to be accessed by operators in a variety of positions including sitting, standing, or from a wheelchair. The invention permits said devices to be moved in a wide variety of vertical, horizontal, and rotational ranges of motion, and permits the devices to be moved clear of the work area while performing other tasks, or safely moved to a position near the ceiling for security or additional workspace conservation. The invention uses a simple, low maintenance counterweight principle for its vertical travel. It also possesses a simple tilt and swivel mechanism, swivel bracket (32), and dual parallelogram arm assembly for its horizontal and rotational ranges of motion. The invention also incorporates the counterweight principle for maintaining the data cables (14) in an organized, aesthetically pleasing manner without loops or kinks through all ranges of motion. Additionally provided is a friction lock (124) for stability of the monitor arm assembly in its vertical travel. Provision for the central processing unit (58) to be mounted atop the column (38) increases computer security.

1 Claim, 7 Drawing Sheets

ERGONOMIC COMPUTER MOUNTING DEVICE PERMITTING EXTENSIVE VERTICAL, HORIZONTAL AND ANGULAR RANGES OF MOTION

CROSS REFERENCES TO RELATED APPLICATIONS

This application is related to Disclosure Document Nos. 442992 and 445159 entitled Computer Ranger and ErgoRanger, respectively. It has previously been filed as a Provisional Patent Application with Ser. No. 60/139,428 dated Jun. 14, 1999.

BACKGROUND

1. Field of Invention

This invention relates to the use of computer workstations or other devices that may be used episodically and would be optimally used with multiple possible vertical, horizontal, and angular positioning for improved ergonomic access and conservation of room space as well as protection from damage, tampering, or unauthorized use in a semi-public or hazardous area.

2. Description of Prior Art

Heretofore placement of computers or other electronic or mechanical devices in work spaces where they may be accessed episodically in a variety of vertical, horizontal, or rotational positions by the operator and subsequently be moved in a vertical and horizontal direction to remove them from the area of the work space has been somewhat limited. Searches of the patent databases and products offered by companies offering ergonomic products revealed a maximum vertical movement of 32 inches, being a variation of U.S. Pat. No. 5,738,316, infra.

Wallstand by Americomp, Inc., Catalog Number S102, Summit X-ray, and others, with no patent art found published since 1979. Prior art consists of a hollow rectangular column with an open track constructed into the vertical length of the column. The column contains a heavy counterweight that is connected by a cable via a pulley and shaft arrangement at the top to a carriage that moves vertically in the open track. It is public domain art, having been constructed and offered for sale by several different unrelated entities for at least 30 years. It is used to mount a frame in which is contained a mechanism to hold an x-ray film cassette. It permits the height of the x-ray film to be varied to correspond with the patient's height in the standing position.

U.S. Pat. No. 5,738,316 to Harry C. Sweere, Donald M Voeller (Apr. 14, 1998), Vertical Work Center, comprising of a wall mounted gas spring actuated arm from which is suspended a monitor caddy and keyboard tray. Mounting of said device on the wall in a position to allow the display and keyboard to be raised to near the ceiling when not in use would allow the monitor and keyboard to be accessed only in the standing position, limiting its access by handicapped persons or persons who desired to access the workstation in a seated position.

U.S. Pat. No. 5,553,820 to Stuart Karten and Dennis Schroeder (Sep. 10, 1996), Adjustable Monitor Arm, consists of a monitor arm and platform with multiple angular, rotational and horizontal ranges of motion but a vertical range of motion of only a few inches, such vertical rotation requiring releasing and re-tensioning a set screw to achieve a few inches of vertical travel.

U.S. Pat. No. 5,108,063 to Clement J Koerber, Sr., L. Dale Foster, William H. Peck (Apr. 28, 1992) consists of a wall mounted device to permit a notebook computer to be mounted closed to a wall, then extended from the wall to a position of function. It has no rotational and very limited vertical motion. The art, within easy reach of the patient or visitors, would be susceptible to tampering or vandalism.

U.S. Pat. No. 4,166,602 to Carl G. Nilsen and Richard A. Gabel (Sep. 4, 1979), described as a counterbalancing arm for x-ray tubehead consists of two parallelogram arms connected end to end, to which is connected a small x-ray tubehead for use in dental x-rays. This art permits the x-ray tubehead to be moved from close to the wall to which it is mounted and extended by virtue of the parallelogram arm to the dental chair. Said art has a vertical range of motion of less than one foot.

U.S. Pat. No. 4,068,961 to John Stevens Ebner, Francis Charles Pizzeri, Charles Grimes Specher, III (Jan. 17, 1978), swivel joint, permits rotation of a mounted platform or device as well as tilting of said platform or mounted device in a fore and aft axis. This device, while incorporated into the current invention being presented, is public domain, being used extensively in the above art and many other commercially available monitor arms including U.S. Pat. No. 5,553,820 to Stuart Karten and Dennis Schroeder (Sep. 10, 1996).

OBJECTS AND ADVANTAGES

Accordingly, several objects and advantages of this invention are to permit vertical travel of such devices as computer monitors and input devices (hereinafter referred to as "said devices"), extension of said devices outward in the horizontal plane, movement of said devices approximately 160 degrees in a horizontal plane, rotation of said devices 270 degrees, tilting of said devices 30 degrees, and independent tilting of an attached keyboard or input device 30 degrees. In the embodiment described and illustrated below, the vertical travel of said devices is 65 inches and the extension of said devices from the column is 23 inches. The advantages of this invention would include but not be limited to use of floor space below said devices, allow the mounted device to be accessed from varied positions and heights of the operator, and protecting said devices from vandalism, tampering, or unauthorized use by children or other persons in a poorly monitored semi-public area. One example of such an application would be a physician's examination room. In such an example, a person could be left in the examination room equipped with said devices without the attendance of the office staff. The physician or other health professional could enter the room, release the friction lock by the lever described in the text and drawings below, lower said devices from a raised position to the optimum level for use, extend the said devices to a position up to the bedside of the patient, perform the function of the said devices, then return said devices to their elevated position, thus accomplishing the advantages listed above.

This invention could either be installed with the column containing the counterweight built inside a wall with only the computer central processing unit, carriage and its locking device, arm, and said devices protruding beyond the plane of the wall or be installed attached to the surface of an existing wall. It could also be used in the "thin client" form of network computing, in which the central processing unit is mounted in a central location in the facility, with only the input devices and monitor mounted on the invention. In addition, its size and bulk could be diminished significantly by the use of flat panel or lighted crystal display monitors combined with appropriate input devices such as a touchscreen, lightpen, mouse, and/or keyboard.

Further objects and advantages will become apparent from a consideration of the ensuing description and accompanying drawings.

Figure 1:
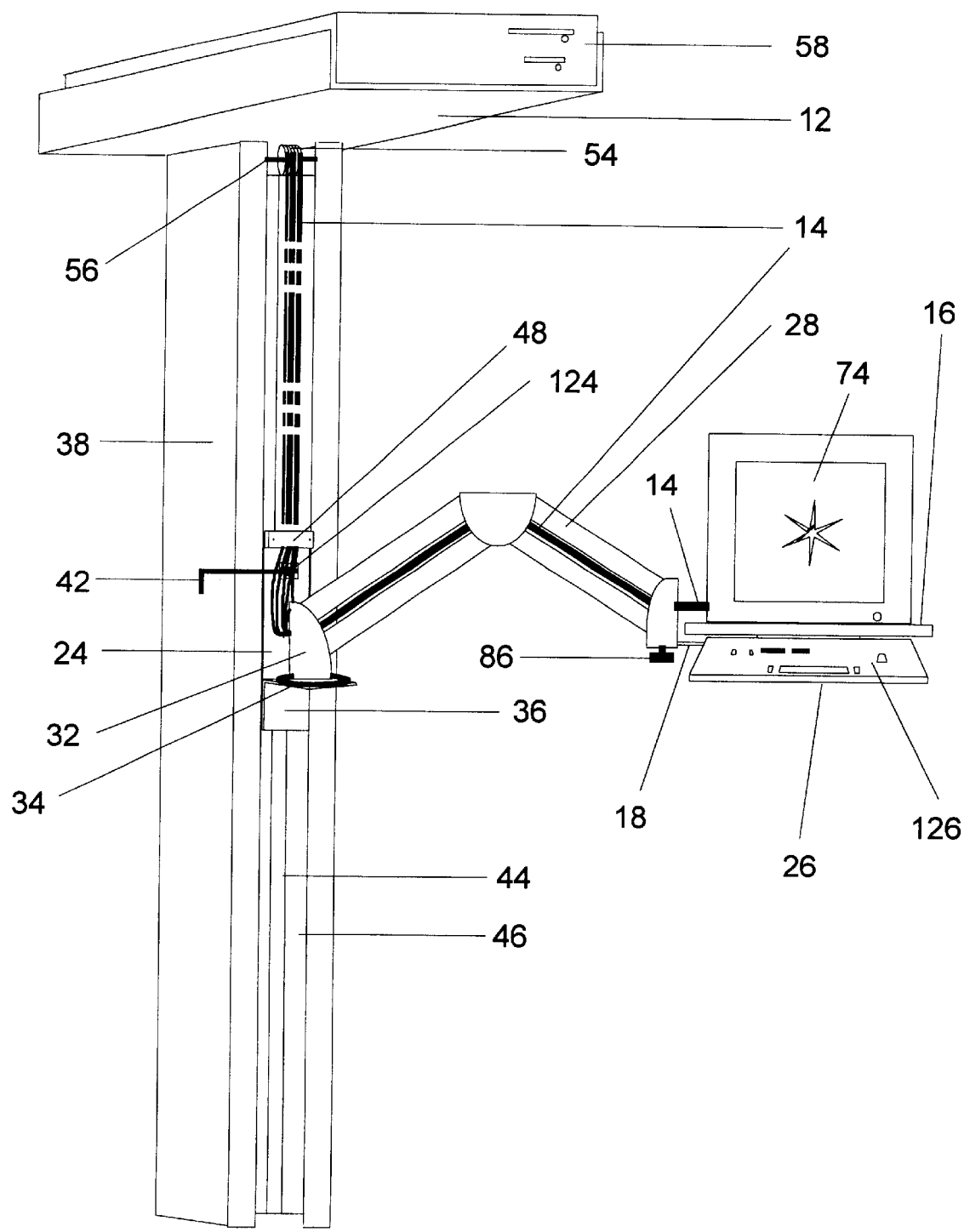
FIG. 1 is a perspective view of the external appearance of the entirety of my invention, as it would be attached to a wall. The trim cap has been removed to show the data cables entering the column over the upper data cable pulleys.

REFERENCE NUMERALS 10 trim cap
12 CPU tray
14 data cables
16 platform
18 solid arm
22 mounting plate
24 carriage
26 keyboard tray
28 dual parallelogram arm assembly
30 tilt/swivel set nut
32 swivel bracket
34 Teflon washer
36 right angle bracket
38 column
40 friction lock opening
42 lock handle
44 friction strip
46 open track
48 distal strain relief
50 weight-bearing cables
52 main pulleys
54 data cable pulleys
56 upper pulley shaft
58 central processing unit
60 main counterweight
62 proximal strain relief
64 secondary counterweight data cable pulleys
66 secondary counterweight
68 pulley shaft bracket
70 cable flanges
72 carriage wheels
74 cathode ray tube
80 keyboard tray set bolts
82 trim panel
84 secondary pulley shaft
86 arm set screw
92 concave recess
94 elongated slot
96 convex surface
98 cleat holes
100 solid arm cleats
102 circular disk
104 tilt/swivel wafer
106 tilt/swivel bolt
108 tensioner spring
110 tilt/swivel washer
112 flange
114 bolt holes
116 data cable channels
118 data cable protector
124 friction lock
126 mounted keyboard
128 fixed keyboard tray swivel
130 movable keyboard tray swivel
132 friction lock mounting holes
134 tilt/swivel base
136 distal arm bracket

SUMMARY

A computer workstation ergonomic device which permits multiple and extensive vertical, horizontal, and rotational ranges of motion of devices such as a cathode ray tube, keyboard, mouse, and light pen. These ranges of motion permit the devices to be used by operators in a variety of positions and conditions such as sitting, standing, or from a wheelchair, and permit the operator to move the input and output devices in or out of the work area, or to positions of increased security out of reach of children, unauthorized, or incompetent persons. The vertical range of motion is accomplished by means of a simple counterweight inside a hollow column, which is attached, via a pulley and cable system, to a movable carriage in a track mounted to the outside of the column. To the carriage is attached an arm assembly which permits the horizontal and rotational ranges of motion of mounted devices. While permitting this wide variety of placement of mounted devices, cables connecting the user interface devices to other devices atop the invention or elsewhere are maintained in a straight path by means of a second counterweight inside the column which maintains slight tension on the cables. The position of the devices atop the column, such as a computer central processing unit, provide for additional security.

PREFERRED EMBODIMENT—DESCRIPTION

FIG. 1 is a perspective view of the entirety of the invention with the trim cap 10 removed to demonstrate the data cables 14 entering the column over the data cable pulleys 54. The device consists of a hollow column 38, the face of which is formed into an open track 46. In the open track 46 is a carriage 24, to which is attached weight-bearing cables 50 (not shown behind the walls of the open track) passing to the top of the column 38 and hence over main pulleys 52 (not shown) inside the column to an interior counterweight approximately equal in mass to the carriage 24, swivel bracket 32, dual parallelogram arm assembly 28, solid arm 18, cathode ray tube 74, platform 16, keyboard tray 26, and mounted keyboard 126, all of which are pictured in this figure. These devices are in turn connected to the central processing unit 58 by data cables 14, which travel up the open track 46 and down to and around the secondary counterweight data cable pulleys 64 (inside the column and not shown in this figure), then thence upward to the central processing unit 58. The carriage 24 is equipped with a friction lock opening 40 through which passes a friction lock 124 operated by a friction lock handle 42, which locks the carriage 24 and its conveyances in an infinite variety of positions. The friction lock 124, when actuated, contacts the friction strip 44 that is permanently attached to the posterior face of the open track 46.

Figure 2:
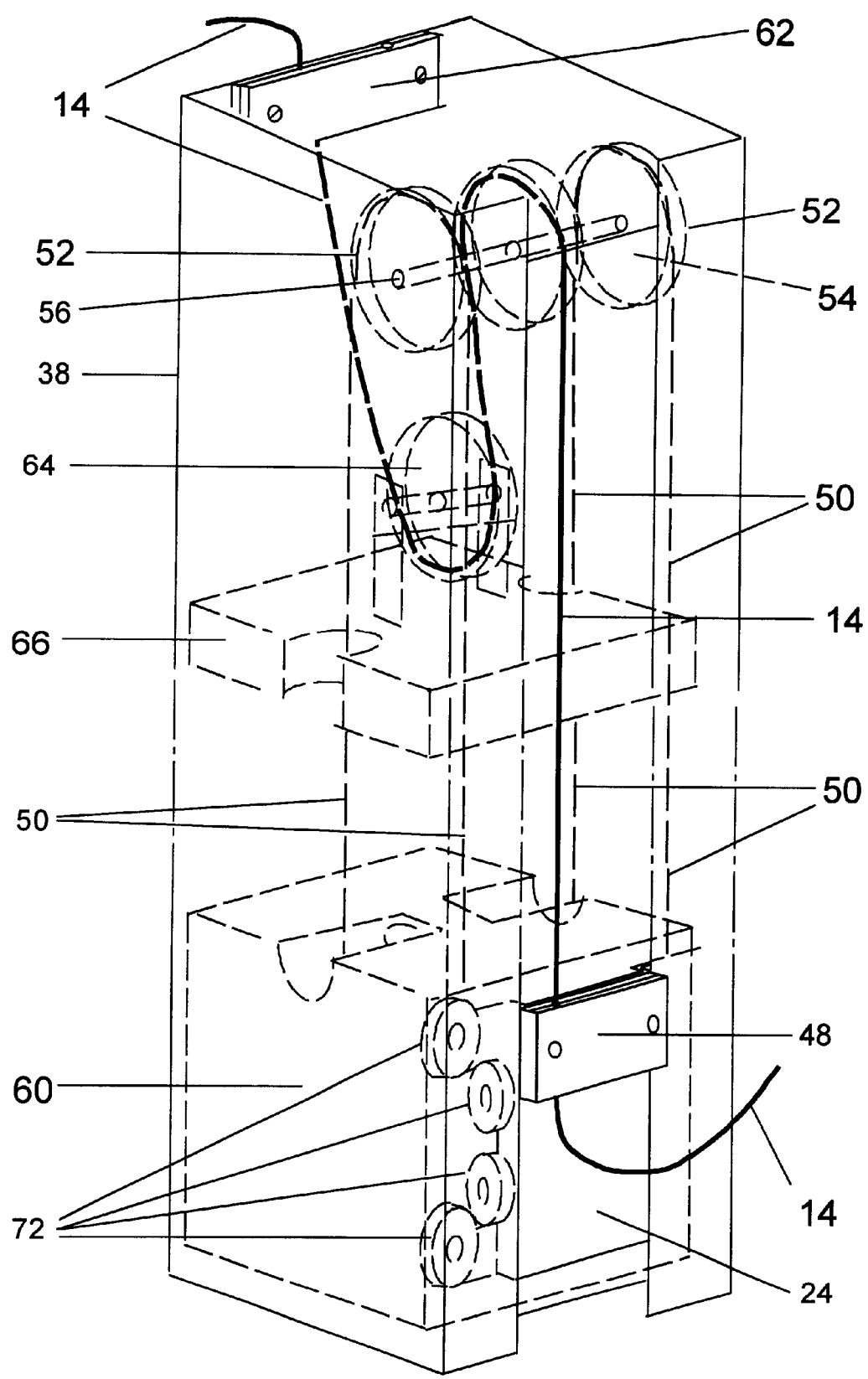
FIG. 2 is a perspective internal view of the device showing the simple mechanical principle of the data cable tensioners and the counterbalancing mechanism of devices mounted on the arm and platform (not shown). Explosion lines to fit the page shorten the appearance of the column.

FIG. 2 is a perspective view of internal mechanisms of my invention in its embodiment as an ergonomic computer workstation. Exploded lines to fit in the drawing have reduced the vertical length of the column 38. The trim cap 10 and CPU tray 12 as well as all but one of the data cables 14 have been removed. The carriage 24 with its two of its four sets of two wheels mounted at right angles to one another inside of the open track 46 are shown. Attached to the upper portion of the carriage 24 is the distal strain relief 48, through which pass the data cables 14. Also attached to the carriage 24 are the weight-bearing cables 50. The data cables 14 and weight-bearing cables 50 pass superiorly up the open track 46 and over their respective pulleys mounted on the upper pulley shaft 56 fixed in the superior portion of the column 38. The data cables 14 then pass downward around the data cable pulleys 54 mounted to the secondary counterweight 66, thence upward to the proximal strain relief 62 and finally to the central processing unit 58 (not shown).

Figure 3:
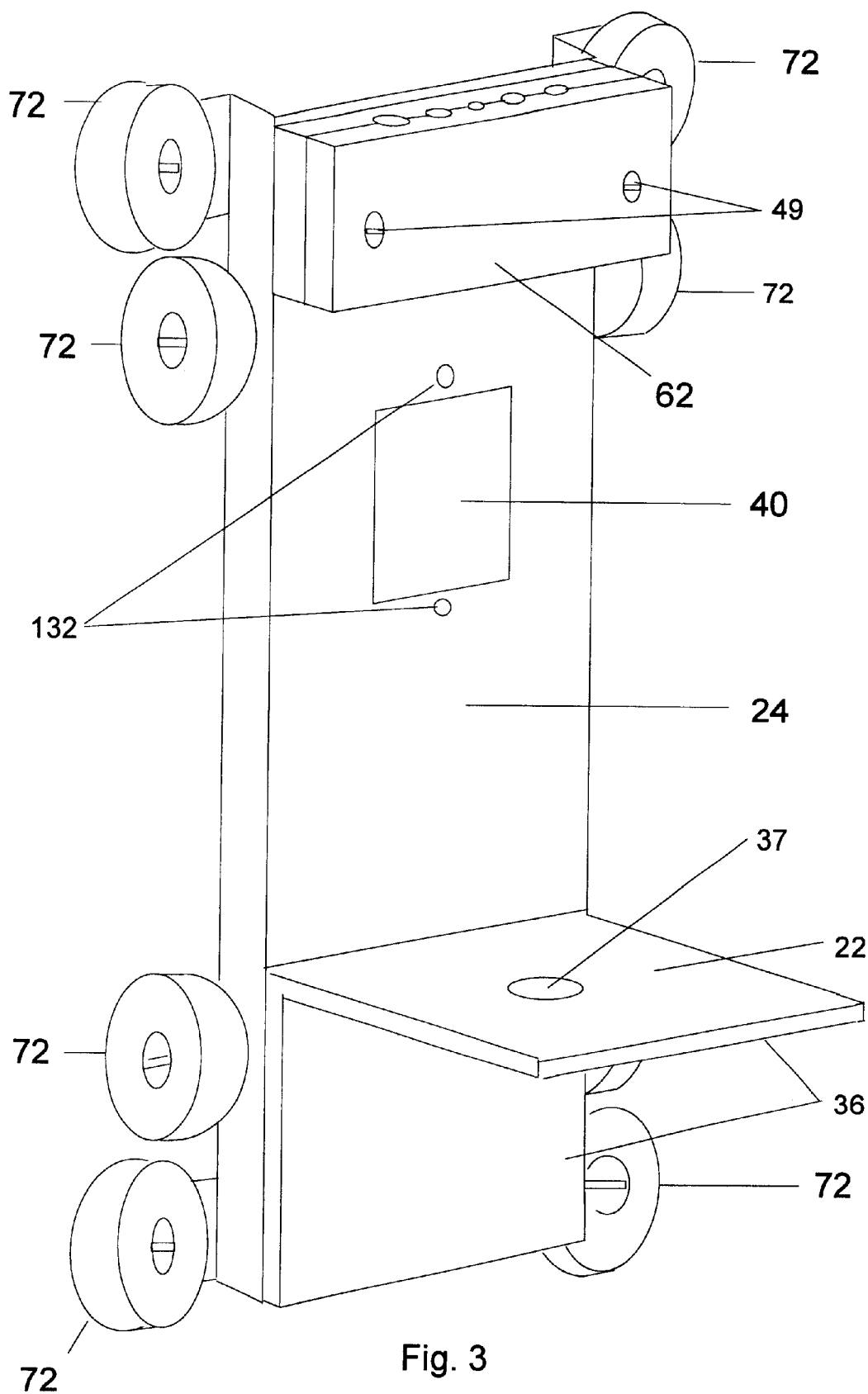
FIG. 3 is an is a perspective detail view of the carriage removed from the open track of the column, including the wheels, strain relief block, opening for the friction lock, and the right angle bracket upon which are mounted counterbalanced devices.

FIG. 3 is a view of the carriage 24, with the carriage wheels 72 mounted at right angles to each other at each corner of the carriage 24. The opening for the friction lock 124 is shown. Also shown are the friction locks mounting holes 132 for affixing the friction lock 124 to the carriage 24.

Figure 4:
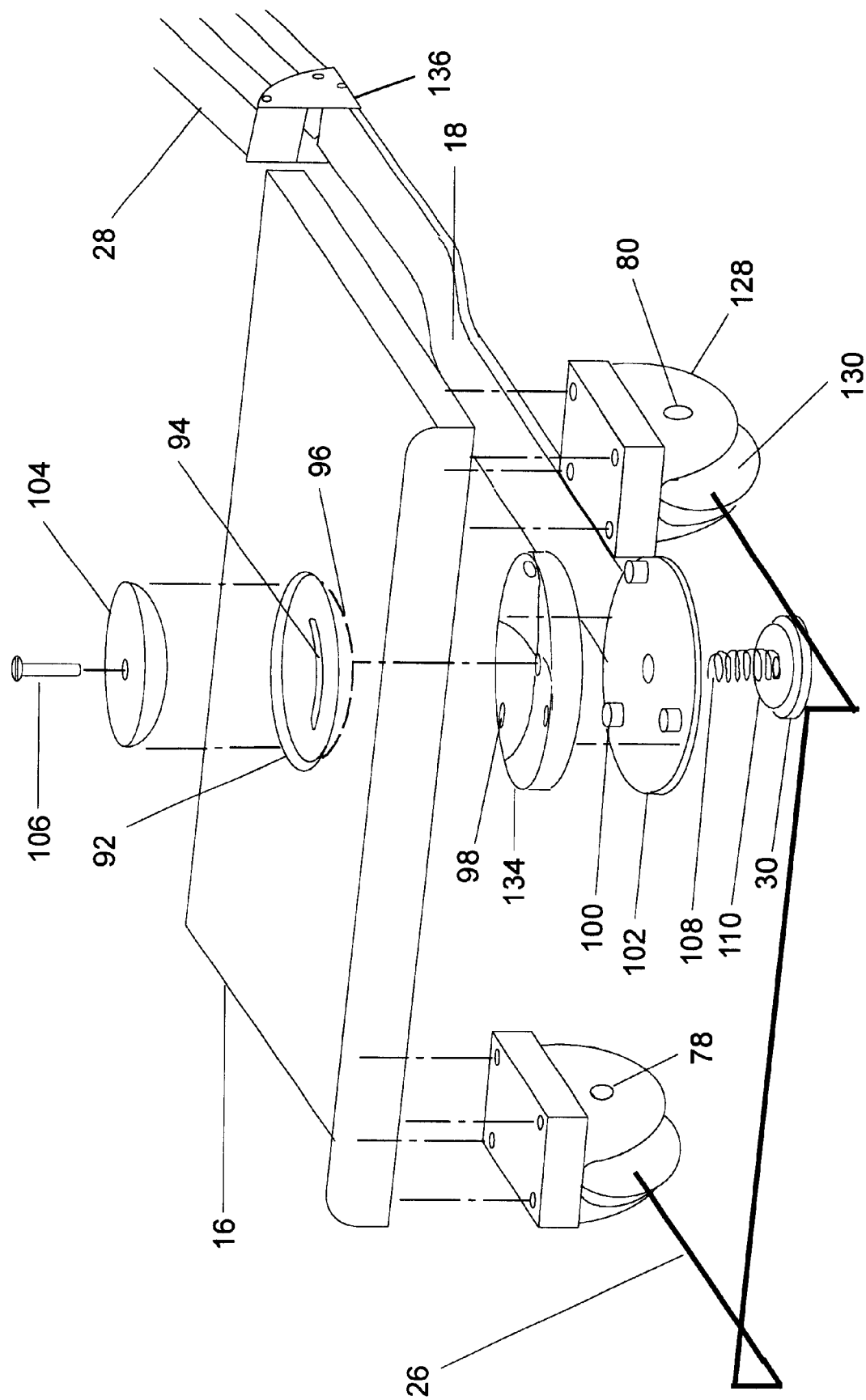
FIG. 4 is a perspective view of the platform that upon which input-output devices are mounted. Also shown are the tilt-swivel mechanism, adjustable angle keyboard tray, and the tip of the dual parallelogram arm that connects the platform to the carriage.

FIG. 4 is a top perspective view of the platform 16 upon which is mounted the cathode ray tube 74 (not shown) described in this embodiment. Attached to the platform 16 is a pair of keyboard tray swivels. The keyboard tray swivels are each composed of two parts; the fixed keyboard tray swivel 128 attached to the platform 16 and the movable keyboard tray swivel 130. Into the movable keyboard tray swivels 130 pass the arms of the keyboard tray 26. Through each of the keyboard tray swivel sections pass keyboard tray set bolts 80. Also shown is the tilt and swivel mechanism with its plurality of parts for permitting rotation and tilting of the platform 16. The tilt and swivel mechanism consists of a concave recess 92 in the top of the platform 16 possessing an elongated slot 94 and constructed of a material having a low coefficient of friction. The bottom of the platform 16 possesses a convex surface 96 resulting from the concave recess 92 molded into the platform 16. Said convex surface 96 of the platform 16 is of the same radius as the tilt/swivel base 134, a disk of material identical to the platform 16 and possessing a concave upper surface, a flat lower surface for attachment to the solid arm 18, a hole for passage of the tilt/swivel bolt 108, and three cleat holes 98 for reception of the solid arm cleats 100. The solid arm cleats 100 are attached to a circular disk 102 mounted on the end of the solid arm 18. The tilt/swivel wafer 104 is mounted in the concave recess 92 on the upper surface of the platform 16, and the entire tilt and swivel mechanism 20 is secured together with the tilt/swivel bolt 108, tensioner spring 110, tilt/swivel washer 112, and tilt/swivel set nut 30. Also illustrated is the solid arm 18, which, by means of a hole traversing its proximal end, attaches to the distal end of the dual parallelogram arm assembly 28 by means of the distal arm bracket 136. The arm set screw 88 passes upward through the distal arm bracket 136 at the end of the distal dual parallelogram arm assembly 28 to contact the inferior surface of the solid arm 18.

Figure 5:
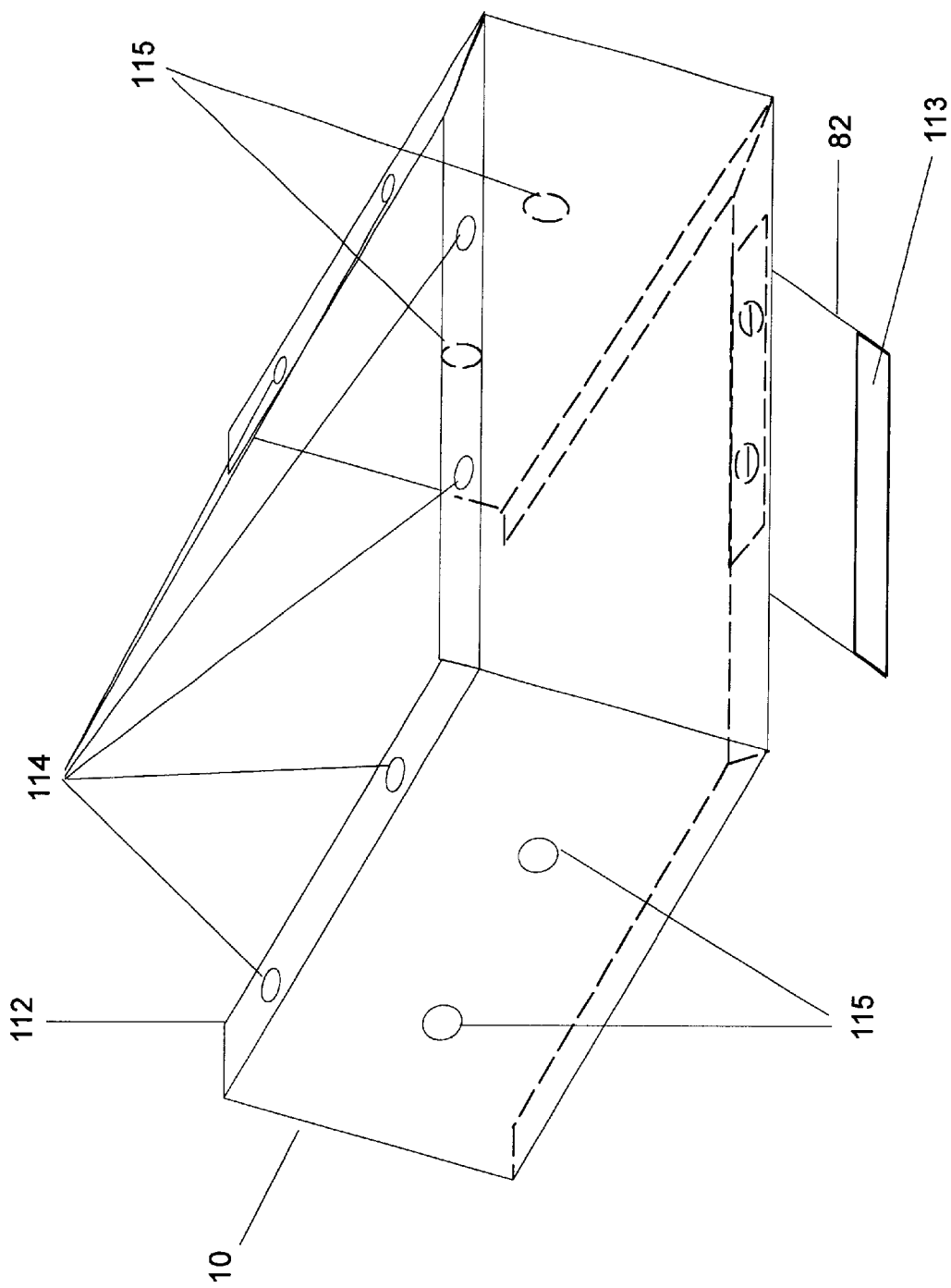
FIG. 5 shows further perspective detail of the secondary counterweight used for tensioning the data cables, including slots built into the counterweight for passage of the main counterweight cables. It also shows the cable flanges convex to the inside to prevent dislodgement of the data cables.

FIG. 5 is a view of the trim cap 10, illustrating the flange 112 and bolt holes 114 which affix the CPU tray 12. Also detailed is the trim panel 82, which, with the trim cap 10 affixed to the top of the column 38, is positioned in front of the data cable pulleys 54, main pulleys 52, and upper pulley shaft 56. Affixed to the inferior edge of the trim panel 82 is the data cable protector 122, which consists of a material to prevent abrasion to the data cables 14.

Figure 6:
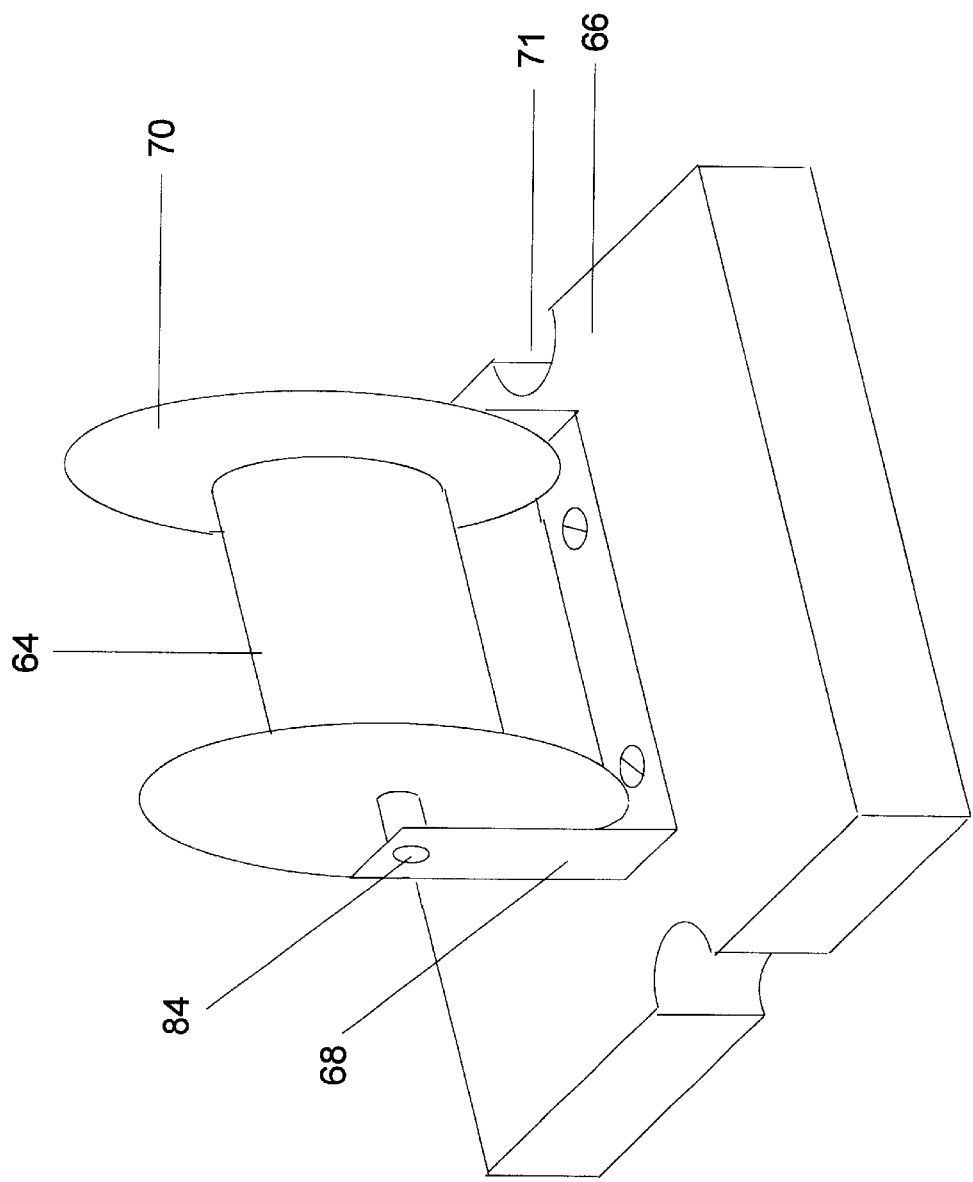
FIG. 6 is a perspective detail view of the trim cap showing the plurality of holes for attachment to the CPU tray and the column. Also shown is the tab that conceals the upper pulley assembly with its edge guard to prevent data cable abrasion.

FIG. 6 is a detail view of the secondary counterweight 66, with its attached pulley shaft bracket 68, the secondary counterweight data cable pulley(s) 64 on the secondary pulley shaft 84, and the cable flanges 70. Illustrated is the configuration of the cable flanges 70 such that the medial face is convex to prevent dislodgement of the data cables 14 during their movement. Also illustrated is a cable channel 71 for passage of the weight-bearing cables 50 to the main counterweight 60.

Figure 7:
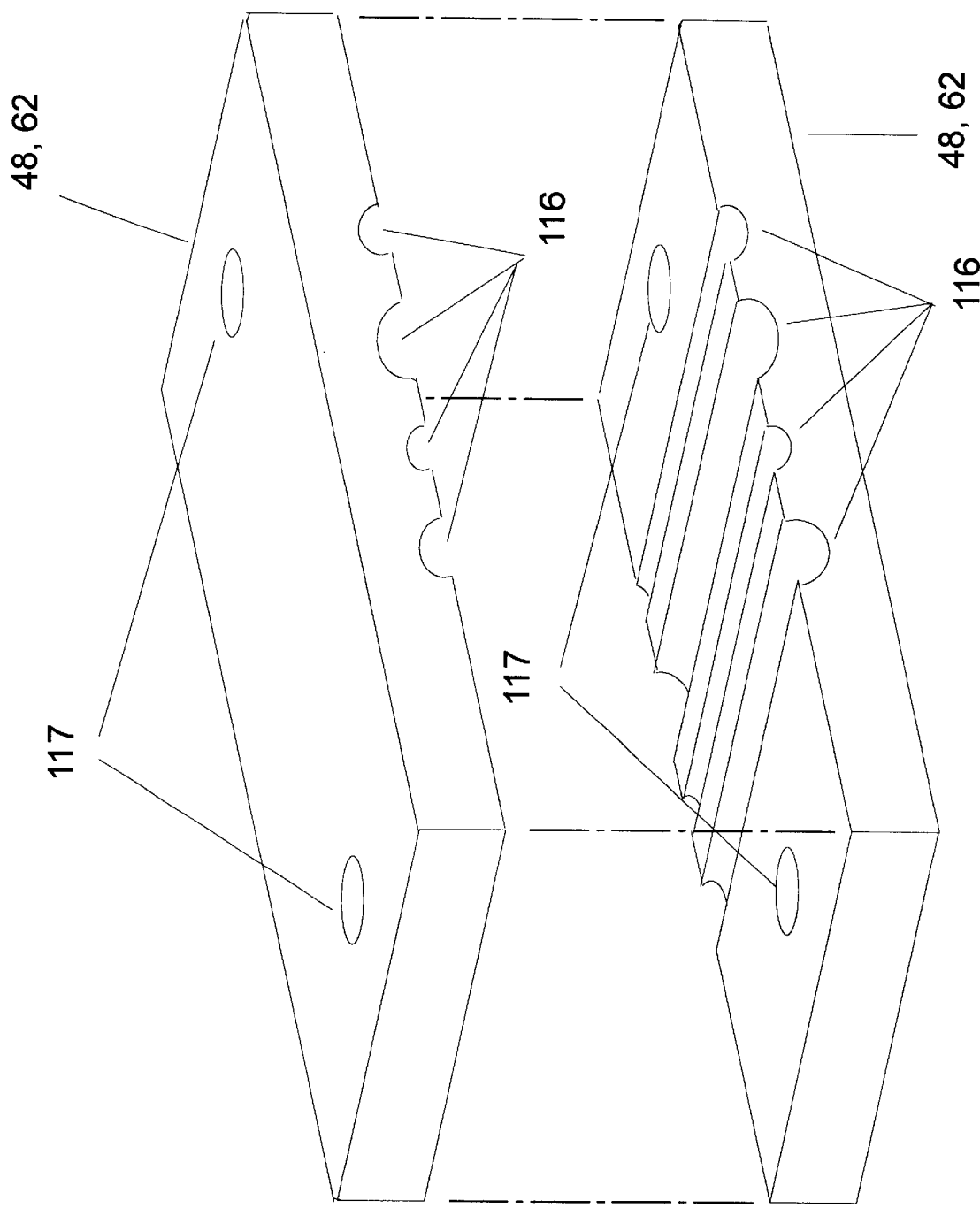
FIG. 7 is a perspective detail view of the strain relief devices that are fixed to the carriage and the posterior upper wall of the column.

FIG. 7 is a detail view of the distal strain relief 48 and the proximal strain relief 62, both of which are identical and each consisting of two sections which are mirror images of each other. Each section has data cable channels 118 and a plurality of holes for fastening the two sections together to securely hold the data cables 14 and fasten the strain relief devices to the posterior upper wall of the column 38 and the carriage 24.

PREFERRED EMBODIMENT—OPERATION

Operation of my invention, registered with the United States Patent and Trademark Office as ErgoRanger, operates on the simple principle of using counterweights as mass to permit vertical motion of heavy objects in two opposing directions and also to maintain tension on cables to prevent entanglement. In addition to the vertical range of motion imparted to the data devices 84 by this principle, range of motion in the horizontal plane is imparted by means of the parallelogram arm 28, which retracts and extends to convey the data devices 84 outward from the column 38, or retracts said devices inward. Rotational range of motion of the data devices 84 is permitted by the attachment of the parallelogram arm 28 to the vertically moving carriage 24 by means of the right angle bracket 36. Said attachment permits this rotational movement by means of the parallelogram arm's 28 attachment to the swivel bracket 32 mounted on the right angle bracket 36, which again is in turn fixed to the carriage 24. Further rotational range of motion is imparted to the data devices 84 by the tilt and swivel mechanism 20, which is attached to the distal end of the solid arm 18. The solid arm 18 is permitted adjustment with the arm set screw 86 in the vertical plane by means of its connection to the distal end of the dual parallelogram arm assembly 28 by the distal arm bracket 136. In this embodiment as a computer workstation, the keyboard tray 26 has an independent range of motion using the keyboard tray swivels, and said tray is fixed in the desired position in said swivels by the keyboard tray set bolts 78.

The carriage 24, monitor arm assembly, and mounted data devices 84 are maintained in position by the friction lock 124 that is attached to the carriage and is operated by the lock handle 42. The friction lock 124, consisting of a cam device, contacts the friction strip 44 affixed to the open track 46. In practice in the inventor's medical office, however, the equality of weights of the multiple counterweights compared to the monitor arm assembly and its mounted data devices 84, combined with the inherent friction of the multiplicity of pulleys and data cables 14, maintains the position of all the components without use of the friction lock. The device is inherently safe as well, illustrated by the case of a child hanging on the platform 16, which simply caused the entire assembly to travel slowly to its lowest position about 18 inches off the floor.

The cable management system functions to keep the data cables 14 safe, organized, and aesthetically pleasing without loops or kinks. When the devices attached to the carriage 24 move vertically, the secondary counterweight 66 and strain relief devices keep the cables under slight tension and straight in the open track 46 at all positions of the data devices 84. The data cables 14 originating at the data devices 84 travel through the parallelogram arm 28 and are fixed in the distal strain relief 48 that also functions as a tensioning device for said cables. Thence said data cables 14 pass upward to the data cable pulleys 54 mounted on the upper pulley shaft 56 in tandem with the main pulleys 52, then downward to and around the data cable pulleys 54 mounted on the secondary counterweight 66. From the secondary counterweight 66 the data cables 14 travel upward to the proximal strain relief 62 mounted near the top and inside the column 38. From there the data cables 14 pass and are connected to the rear of the central processing unit 58, which in this embodiment is a low profile desktop model mounted in the CPU tray 12 cantilevered atop the trim cap 10. Additionally, in the inventors configuration but not depicted in the drawings, a pair of multimedia stereo speakers 90 are attached to the exterior side walls of the column 38 immediately below the CPU tray 12. The entire invention presents an aesthetically pleasing appearance with a minimum of visible data cables 14, while still providing a variety of vertical, horizontal, and rotational ranges of motion for the data devices 84. This permits said data devices 84 in this embodiment to be accessed sitting or standing, allow the physician to maintain eye contact with the patient, and still allow the data devices 84 to be moved clear of the patient for performing examinations or procedures, and elevation of said data devices 84 to a position near the ceiling for increasing available workspace and enhancing computer security. The use of the invention for mounting a multiplicity of devices, both medical and otherwise, which would be used continuously or intermittently and then moved from the proximate workspace or to a position of increased security, is also claimed.

OTHER EMBODIMENTS

Minor Surgical Procedures—Description

This invention could reasonably be used to mount a wide variety of medical devices, instruments, or diagnostic tools, and such use is also claimed in this patent application.

Minor Surgical Procedures—Operation

ErgoRanger, this invention, could reasonably be used to perform surgical, diagnostic, or therapeutic procedures using such devices as medical lasers, endoscopes, or any other device mounted on the invention, and use of my invention for such procedures is also claimed.

Industrial Use—Description

The invention could also reasonably be configured for using any device mounted on the invention.

Industrial Use—Operation

Mechanical or electronic devices used in any industry that require intermittent use or use in a variety of positions, optimization of workspace, or moving said devices away from the workspace would be mounted on the invention with the advantages described above, and this embodiment is also claimed.

Other Computer or Device Operation—Description

This invention could reasonably be altered in dimensions and weight for the use of flat panel displays or "thin client" computer operations either as a stand-alone device or connected to a network. Components such as the CPU tray 12 and central processing unit 58 could be eliminated for use in a configuration only requiring data devices 84, cathode ray tube(s) 74, or other input or output devices.

Other Computer or Device Operation—Operation

The invention could be altered in size and weight such that any computer, mechanical or electrical device, regardless of size and weight, could be mounted for the advantages described above, and any such use of my invention is also claimed.

Conclusions, Ramifications, and Scope

Accordingly, it can be seen that this invention could be used in a multiplicity of situations where access to devices is necessary in a variety of vertical, horizontal, and rotational ranges of motion by persons of various heights, positions, and handicaps.

Although the description above contains many specificities, these should not be construed as limiting the scope of the invention but as merely providing illustrations of some of the presently preferred embodiments of this invention. Various other embodiments and ramifications are possible within its scope. For example, motorizing the travel of the carriage 24 and/or the dual parallelogram arm assembly 28 would facilitate use by the handicapped.

Thus the scope of the invention should be determined by the appended claims and their legal equivalents, rather than by the examples given.

What is claimed is:

1. An ergonomic mounting device comprising a column having an open track, a carriage movable in an extended vertical range on said track, said carriage having weight bearing-cables connected thereto and to a counterweight within said column, a right angle bracket attached to the carriage, a dual parallelogram arm having one end rotatably mounted on said right angle bracket and a platform with a tilt and swivel mechanism mounted to an opposite end of said dual parallelogram arm, said platform comprises a keyboard tray capable of tilting to facilitate it's use by an operator, a cable management system comprising a secondary counterweight within said column having secondary counterweight data pulleys mounted thereto and data cable pulleys mounted atop the column, a distal strain relief device attached adjacent to the top of the column and a proximal strain relief device attached to the carriage, said cable management system permitting data cables to move in a straight path throughout the range of motion of the carriage, said ergonomic mounting device further comprising a central processing unit tray mounted atop said column and a central processing unit positioned therein as a computer security means.

* * * * *